US009098766B2

(12) United States Patent
Dariush et al.

(10) Patent No.: US 9,098,766 B2
(45) Date of Patent: Aug. 4, 2015

(54) CONTROLLED HUMAN POSE ESTIMATION FROM DEPTH IMAGE STREAMS

(75) Inventors: Behzad Dariush, Sunnyvale, CA (US); Youding Zhu, Palo Alto, CA (US); Kikuo Fujimura, Palo Alto, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1063 days.

(21) Appl. No.: 12/317,369

(22) Filed: Dec. 19, 2008

(65) Prior Publication Data

US 2009/0175540 A1 Jul. 9, 2009

Related U.S. Application Data

(60) Provisional application No. 61/016,298, filed on Dec. 21, 2007.

(51) Int. Cl.
*G06K 9/46* (2006.01)
*G06K 9/32* (2006.01)
*G06K 9/00* (2006.01)
*G06T 7/20* (2006.01)

(52) U.S. Cl.
CPC .............. *G06K 9/32* (2013.01); *G06K 9/00362* (2013.01); *G06T 7/2046* (2013.01); *G06T 2207/10016* (2013.01); *G06T 2207/30196* (2013.01)

(58) Field of Classification Search
None
See application file for complete search history.

(56) References Cited

U.S. PATENT DOCUMENTS

| 5,159,249 A | 10/1992 | Megherbi |
| 5,276,390 A | 1/1994 | Fisher et al. |
| 5,293,461 A | 3/1994 | Grudic et al. |
| 5,430,643 A | 7/1995 | Seraji |
| 5,550,953 A | 8/1996 | Seraji |
| 5,581,666 A | 12/1996 | Anderson |
| 5,586,224 A | 12/1996 | Kunii et al. |
| 5,675,720 A | 10/1997 | Sato et al. |
| 5,737,500 A | 4/1998 | Seraji et al. |
| 5,808,433 A | 9/1998 | Tagami et al. |
| 5,815,397 A | 9/1998 | Saito et al. |
| 6,317,651 B1 | 11/2001 | Gerstenberger et al. |
| 6,331,181 B1 | 12/2001 | Tierney et al. |
| 6,363,160 B1 | 3/2002 | Bradski et al. |
| 6,424,885 B1 | 7/2002 | Niemeyer et al. |
| 6,456,901 B1 | 9/2002 | Xi et al. |
| 6,493,608 B1 | 12/2002 | Niemeyer |
| 6,674,877 B1 * | 1/2004 | Jojic et al. ..................... 382/103 |

(Continued)

OTHER PUBLICATIONS

Chiacchio, P., et al., "Closed-Loop Inverse Kinematics Schemes for Constrained Redundant Manipulators with Task Space Augmentation and Task Priority Strategy," The International Journal of Robotics Research, Aug. 1991, pp. 410-425, vol. 10, No. 4.*

(Continued)

*Primary Examiner* — Kim Vu
*Assistant Examiner* — Fred Hu
(74) *Attorney, Agent, or Firm* — Fenwick & West LLP

(57) ABSTRACT

A system, method, and computer program product for estimating upper body human pose are described. According to one aspect, a plurality of anatomical features are detected in a depth image of the human actor. The method detects a head, neck, and torso (H-N-T) template in the depth image, and detects the features in the depth image based on the H-N-T template. An estimated pose of a human model is estimated based on the detected features and kinematic constraints of the human model.

22 Claims, 11 Drawing Sheets (5 of 11 Drawing Sheet(s) Filed in Color)

(56) References Cited

U.S. PATENT DOCUMENTS

| | | | |
|---|---|---|---|
| 6,699,177 | B1 | 3/2004 | Wang et al. |
| 6,708,142 | B1 | 3/2004 | Baillot et al. |
| 6,786,896 | B1 | 9/2004 | Madhani et al. |
| 6,788,809 | B1 | 9/2004 | Grzeszczuk et al. |
| 6,853,964 | B1* | 2/2005 | Rockwood et al. ............. 703/2 |
| 6,985,620 | B2 | 1/2006 | Sawhney et al. |
| 7,135,003 | B2* | 11/2006 | Dariush .................. 600/595 |
| 7,457,733 | B2 | 11/2008 | Maille et al. |
| 7,688,016 | B2 | 3/2010 | Aghili |
| 7,859,540 | B2 | 12/2010 | Dariush |
| 8,090,155 | B2 | 1/2012 | Lacey et al. |
| 8,170,287 | B2 | 5/2012 | Dariush et al. |
| 2003/0113018 | A1* | 6/2003 | Nefian et al. ................ 382/181 |
| 2004/0193413 | A1 | 9/2004 | Wilson et al. |
| 2005/0001842 | A1 | 1/2005 | Park et al. |
| 2005/0043718 | A1 | 2/2005 | Madhani et al. |
| 2005/0177276 | A1 | 8/2005 | Morel et al. |
| 2005/0209534 | A1 | 9/2005 | Dariush |
| 2005/0271279 | A1 | 12/2005 | Fujimura et al. |
| 2006/0074527 | A1 | 4/2006 | Bhatt et al. |
| 2006/0241809 | A1 | 10/2006 | Goswami et al. |
| 2006/0269145 | A1* | 11/2006 | Roberts ..................... 382/228 |
| 2006/0293790 | A1 | 12/2006 | Gienger |
| 2007/0013336 | A1 | 1/2007 | Nowlin et al. |
| 2007/0083290 | A1 | 4/2007 | Nagasaka |
| 2007/0140562 | A1 | 6/2007 | Linderman |
| 2007/0146371 | A1 | 6/2007 | Dariush |
| 2007/0162164 | A1 | 7/2007 | Dariush |
| 2007/0233280 | A1 | 10/2007 | Bacon et al. |
| 2007/0255454 | A1 | 11/2007 | Dariush |
| 2008/0019589 | A1 | 1/2008 | Yoon et al. |
| 2008/0181459 | A1 | 7/2008 | Martin et al. |
| 2008/0234864 | A1 | 9/2008 | Sugiura et al. |
| 2008/0247649 | A1 | 10/2008 | Cheng |
| 2008/0317331 | A1 | 12/2008 | Winn et al. |
| 2010/0145521 | A1 | 6/2010 | Prisco et al. |

OTHER PUBLICATIONS

Agarwal, A. et al., "Recovering 3d Human Pose from Monocular Images," *IEEE Transactions on Pattern Analysis and Machine Intelligence*, Jan. 2006, vol. 28, No. 1, pp. 44-58.

Barron, C., et al., "Estimating Anthropometry and Pose from a Single Image," *Computer Vision and Pattern Recognition*, 2000, vol. 1, pp. 669-676.

Chan, T. et al., "A Weighted Least-Norm Solution Based Scheme for Avoiding Joint Limits for Redundant Joint Manipulators," Apr. 1995, *IEEE Transactions on Robotics and Automation*, vol. 11, No. 2.

Gavrila, D. "The Visual Analysis of Human Movement: A Survey," Jan. 1999, *Computer Vision and Image Understanding*, vol. 73, No. 1, pp. 82-98.

Moeslund, T. et al., "A Survey of Advances in Vision-Based Human Motion Capture and Analysis," *Computer Vision and Image Understanding*, 2006, vol. 104, pp. 90-126.

Mori, G. et al., "Recovering 3D Human Body Configurations Using Shape Contexts," *IEEE Transactions on Pattern Analysis and Machine Intelligence*, Jul. 2006, vol. 28 No. 7, pp. 1052-1062.

PCT International Search Report and Written Opinion, PCT Application No. PCT/US2008/087657, Mar. 19, 2009, 6 pages.

PCT International Search Report and Written Opinion, PCT Application No. PCT/US2010/020427, Mar. 2, 2010, 7 pages.

Rehg, J. M. et al., "Model-based Tracking of Self-Occluding Articulated Objects," *Proceedings of the 5th International Conference on Computer Vision*, Jun. 20-23, 1995, pp. 612-617.

Shakhnarovich, G. et al., "Fast Pose Estimation with Parameter Sensitive Hashing," *9th IEEE International Conference on Computer Vision*, Oct. 13-16, 2003, pp. 750-757, Nice, France.

Siciliano, B. et al., "A General Framework for Managing Multiple Tasks in Highly Redundant Robotic Systems," *International Conference on Advanced Robotics*, 1991, vol. 2, pp. 1211-1216, Pisa, Italy.

Sidenbladh, H. et al., "Stochastic Tracking of 3D Human Figures Using 2D Image Motion," *6th European Conference on Computer Vision Proceedings, Part II*, Jun.-Jul. 2000, pp. 702-718, Dublin, Ireland.

Taylor, C. J., "Reconstruction of Articulated Objects from Point Correspondences in a Single Uncalibrated Image," *Computer Vision and Image Understanding*, Dec. 2000, vol. 80, Issue 3, pp. 349-363.

Wang, L. et al., "Recent Developments in Human Motion Analysis," *Pattern Recognition*, 2003, vol. 36, No. 3, pp. 585-601.

Zghal, H. et al., "Efficient Gradient Projection Optimization for Manipulators with Multiple Degrees of Redundancy," *International Conference on Robotics and Automation*, 1990, vol. 2, pp. 1006-1011.

Zhu, Y. et al., "Controlled Human Pose Estimation from Depth Image Streams," *Computer Vision and Pattern Recognition Workshops*, 2008, 8 pages.

Malassiotis, S. et al., "A Gesture Recognition System Using 3D Data," Proceedings of the First Internatinal Symposium on 3D Data Processing Visualization and Transmission, Jun. 19-21, 2002, four pages, Padova, Italy.

Yang, J. et al., "Two-Dimensional PCA: A New Approach to Appearance-Based Face Representation and Recognition," IEEE Transactions on Pattern Analysis and Machine Intelligence, Jan. 2004, pp. 131-137, vol. 26, No. 1.

United States Patent and Trademark Office, Non-Final Rejection, U.S. Appl. No. 12/258,184, Jul. 25, 2012, 25 pages.

United States Patent and Trademark Office, Non-Final Rejection, U.S. Appl. No. 12/455,257, Jun. 26, 2012, 20 pages.

United States Patent and Trademark Office, Non-Final Rejection, U.S. Appl. No. 12/709,287, Oct. 3, 2012, 22 pages.

Chiacchio, P. et al., "Closed-Loop Inverse Kinematics Schemes for Constrained Redundant Manipulators with Task Space Augmentation and Task Priority Strategy," *The International Journal of Robotics Research*, Aug. 1991, pp. 410-425, vol. 10, No. 4.

Choi, K-J. et al., "Online motion retargetting," *The Journal of Visualization and Computer Animation*, 2000, pp. 223-235, vol. 11.

Podder, T. et al., "Motion Planning and Control of UVMS: A Unified Dynamics-based Approach," *Proceedings of OCEANS 2003*, Sep. 22-26, 2003, pp. 2446-2453, vol. 5, San Diego, CA, USA.

* cited by examiner

CONTROLLED HUMAN POSE ESTIMATION FROM DEPTH IMAGE STREAMS

RELATED APPLICATIONS

This application claims a benefit of, and priority under 35 USC §119(e) to, U.S. Provisional Patent Application No. 61/016,298, filed Dec. 21, 2007, the contents of which are herein incorporated by reference herein in their entirety.

This application is related to U.S. patent application Ser. No. 11/614,930, filed Dec. 21, 2006, titled "Reconstruction, Retargetting, Tracking, and Estimation of Motion for Articulated Systems", U.S. patent application Ser. No. 11/734,758, filed Apr. 12, 2007, titled "Control Of Robots From Human Motion Descriptors", U.S. patent application Ser. No. 12/258,184, filed Oct. 24, 2008, entitled "Real-Time Self Collision And Obstacle Avoidance Using Weighting Matrix", and U.S. patent application Ser. No. 12/257,664, filed Oct. 24, 2008, entitled "Real-Time Self Collision And Obstacle Avoidance", all of which are incorporated by reference herein in their entirety.

BACKGROUND

1. Field of Disclosure

The disclosure generally relates to the field of tracking motion of a system, and more specifically, to pose estimation from visual input.

2. Description of the Related Art

Recovering human pose from visual observations is a challenging problem in the field of computer vision because of the complexity of the models which relate observation with pose. An effective solution to this problem has many applications in areas such as video coding, visual surveillance, human gesture recognition, biomechanics, video indexing and retrieval, character animation, and man-machine interaction. See D. Gavrila, "The visual analysis of human movement: a survey", *Computer Vision and Image Understanding*, 73(1):82-98 (1999); see also L. Wang, W. Hu, and T. Tan, "Recent developments in human motion analysis" *Pattern Recog.*, 36(3): 585-601 (2003); see also T. B. Moeslund, A. Hilton, and V. Kruger, "A survey of advances in vision-based human motion capture and analysis", *Computer Vision and Image Understanding*, 104(2,3):90-126 (2006), all of which are incorporated by reference herein in their entirety.

One of the major difficulties in estimating pose from visual input involves the recovery of the large number of degrees of freedom in movements which are often subject to kinematic constraints such as joint limit avoidance, and self penetration avoidance between two body segments. Such difficulties are compounded with insufficient temporal or spatial resolution, ambiguities in the projection of human motion onto the image plane, and when a certain configuration creates self occlusions. Other challenges include the effects of varying illumination and therefore appearance, variations of appearance due to the subject's attire, required camera configuration, and real time performance for certain applications.

Traditionally there are two categories of approaches in solving the pose estimation problem, model based approaches and learning based approaches. Model-based approaches rely on an explicitly known parametric human model, and recover pose either by inverting the kinematics from known image feature points on each body segment (See C. Barron and I. A. Kakadiaris, "Estimating anthropometry and pose from a single image", *Computer Vision and Pattern Recognition*, 1:669-676 (2000); see also C. J. Taylor, "Reconstruction of articulated objects from point correspondences in a single uncalibrated image", *Computer Vision and Image Understanding*, 80(3):349-363 (2000), both of which are incorporated by reference herein in their entirety), or by searching high dimensional configuration spaces which is typically formulated deterministically as a nonlinear optimization problem (See J. M. Rehg and T. Kanade, "Model-based tracking of selfoccluding articulated objects", *ICCV*, pages 612-617 (1995), the content of which is incorporated by reference herein in its entirety), or probabilistically as a maximum likelihood problem (See H. Sidenbladh, M. J. Black, and D. J. Fleet, "Stochastic tracking of 3D human figures using 2D image motion", *ECCV*, pages 702-718, (2000), the content of which is incorporated by reference herein in its entirety). The model-based approaches typically require good initialization, high dimensional feature points, and are computationally intensive. In addition, the model-based approaches generally do not enforce bodily constraints such as joint limitation and self penetration avoidance, they often generate erroneous estimation results.

In contrast, learning based approaches directly estimate body pose from observable image quantities. See A. Agarwal and B. Triggs, "Recovering 3d human pose from monocular images", *IEEE Trans. on Pattern Analysis and Machine Intelligence*, 28(1):44-58 (2006), see also G. Mori and J. Malik, "Recovering 3d human body configurations using shape contexts", *IEEE Trans. on Pattern Analysis and Machine Intelligence*, 28(7):1052-1062 (2006), both of which are incorporated by reference herein in their entirety. In example based learning, inferring pose is typically formulated as a k-nearest neighbors search problem where the input is matched to a database of training examples whose three-dimensional (3D) pose is known. Computational complexity of performing similarity search in high dimensional spaces and on very large data sets has limited the applicability of these approaches. Although faster approximate similarity search algorithms have been developed based on Locally-Sensitive Hashing, computation speed remains a challenge with learning based approaches. See G. Shakhnarovich, P. Viola, and T. Darrell, "Fast pose estimation with parameter sensitive hashing", *ICCV*, 2:750-757 (2003), the content of which is incorporated by reference herein in its entirety. Similar to the model based approaches, the learning based approaches also tend to be computationally intensive. In addition, in order for a pose to be properly recognized using a learning based approach, a system must process ("learn") the pose before hand. Thus, generally only a small set of pre-programmed human pose can be recognized using the learning based approaches.

Hence, there is lacking, inter alia, a system and method for efficiently and accurately estimating human pose in real time.

SUMMARY

Embodiments of the present invention provide a method (and corresponding system and computer program product) for upper body pose estimation of human actors. According to one aspect, a plurality of anatomical features are detected in a depth image of the human actor. The method detects a head, neck, and torso (H-N-T) template in the depth image, and detects the features in the depth image based on the H-N-T template. An estimated pose of a human model is estimated based on the detected features and kinematic constraints of the human model.

According to another aspect, the method generates predicted feature positions based on the detected features and kinematic constraints of the human model. The predicted feature positions are subsequently utilized to resolve subsequent ambiguities and to estimate intermittently missing or occluded features.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The patent or application file contains at least one drawing executed in color. Copies of this patent or patent application publication with color drawing(s) will be provided by the Office upon request and payment of the necessary fee.

The disclosed embodiments have other advantages and features which will be more readily apparent from the detailed description, the appended claims, and the accompanying drawings (figures). A brief description of the drawings is as follows:

DETAILED DESCRIPTION

The present invention provides a system (and corresponding method and computer program product) for estimating poses of a motion generator in real time. The system detects key features in visual input of the generator, and reconstructs the pose of the generator on a model based on the detected features. The system also makes predictions of feature positions and utilizes the predictions to resolve ambiguities when multiple candidate features are detected, and to estimate intermittently missing or occluded features.

For the sake of illustration, without loss of generality, this description assumes that the motion generator is a human actor and the model represents a human model that is configured based on a structure of the human actor to resemble a pose of the upper body of the human actor. Those of skill in the art will recognize that the techniques described herein can be utilized to estimate whole body poses of the human actor and other motion generators such as animals, for example.

The Figures (FIGS.) and the following description relate to embodiments of the present invention by way of illustration only. Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Figure 1:
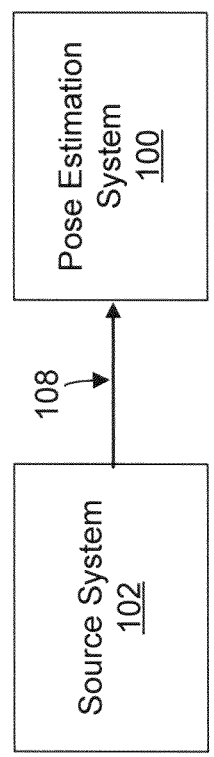
FIG. 1 is a block diagram illustrating a pose estimation system for estimating pose of a motion generator in a source system in accordance with one embodiment of the invention.

FIG. 1 is a block diagram illustrating a pose estimation system 100 for estimating poses of a human actor in a source system 102. The source system 102 generates a series of visual images of the human actor and transmits them to the pose estimation system 100 in an image stream 108. In one embodiment, the source system 102 utilizes a camera such as a time-of-flight camera (also called a TOF camera, a time-of-flight range image sensor) to continuously capture poses of the human actor and transmits a depth image stream 108 to the pose estimation system 100. The pose estimation system 100 detects key features in the received image stream 108 and reconstructs the human actor's pose in a human model.

In addition to or instead of providing human pose estimation, the pose estimation system 100 may be used for other purposes such as motion retargeting, tracking and estimation, and joint torque estimation in biomechanics. In motion retargeting, the pose estimation system 100 generates motion descriptors of the source system 102 based on the reconstructed poses, and transmits the motion descriptors to a motion retargeting system, which generates joint variables for controlling the motion of a target system to simulate the motion in the source system 102. Further information of motion retargeting is found in U.S. patent application Ser. No. 11/734,758, filed Apr. 12, 2007, titled "Control Of Robots From Human Motion Descriptors", the content of which is incorporated by reference herein in its entirety.

System Architecture

Figure 2:
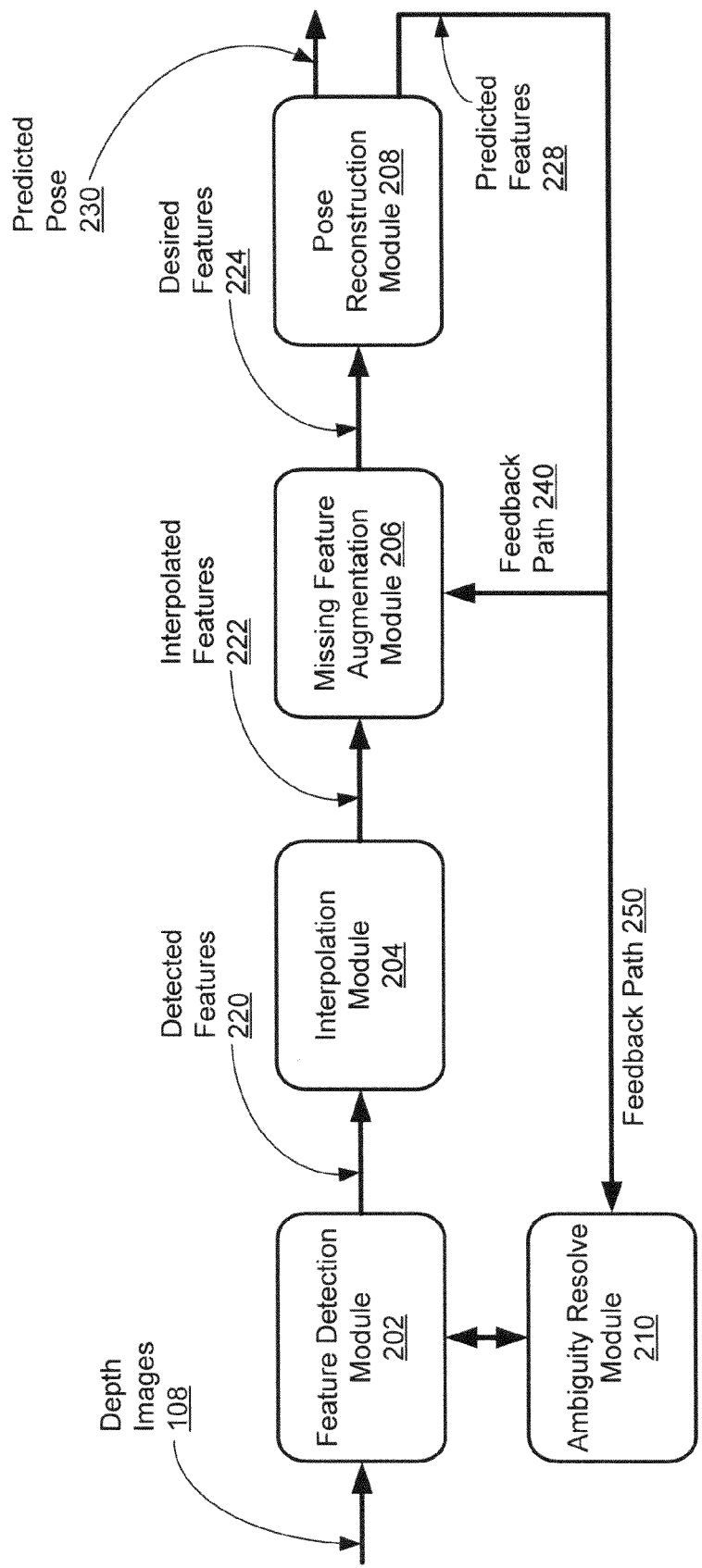
FIG. 2 is a block diagram illustrating a configuration of the pose estimation system shown in FIG. 1 in accordance with one embodiment of the invention.
Figure 5B:
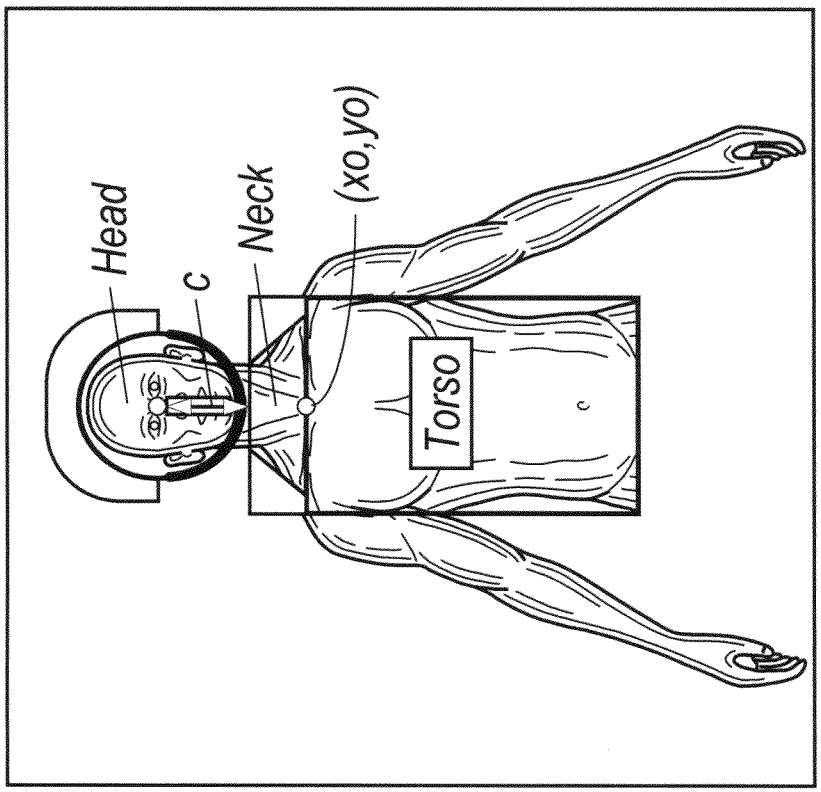
FIGS. 5A-B are diagrams illustrating a human model in accordance with one embodiment of the invention.
Figure 5A:
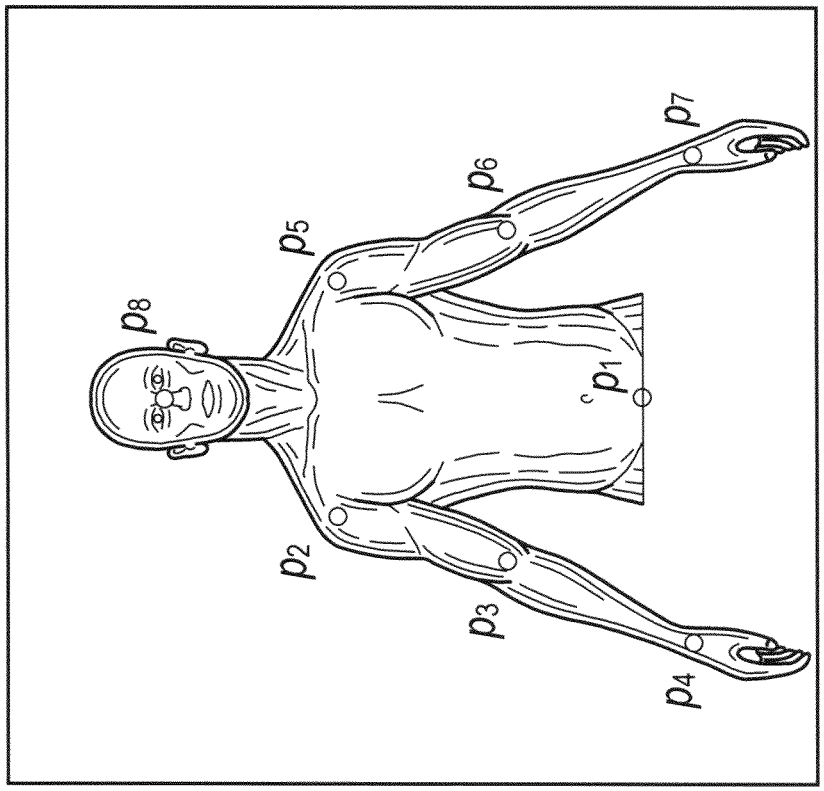

FIG. 2 is a block diagram illustrating a configuration of the pose estimation system 100 for estimating upper body human poses according to one embodiment. The pose estimation system 100 reconstructs upper body human pose from multiple features detected in the depth image stream 108. The features (or feature points, anatomical features, key points) correspond to 3D positions of prominent anatomical landmarks on the human upper body. Without loss of generality, the pose estimation system 100 tracks eight (k=8) such upper body features as illustrated in FIG. 5A. As shown, the eight features are waist, head center, left shoulder, right shoulder, left elbow, right elbow, left wrist and right wrist. The reconstructed (or estimated) human pose q is described in the human model that tracks the human actor's pose. In one embodiment, the human model is a human anatomical model that closely resembles the body of the human actor.

The pose estimation system 100 comprises a feature detection module (also called a visual processing module) 202, an interpolation module 204, a missing feature augmentation module 206, a pose reconstruction module (also called a constrained pose estimation and tracking module, a constrained closed loop inverse kinematics module) 208, and an ambiguity resolve module 210.

The feature detection module 202 is configured to detect m (m=0 . . . k) features, denoted by $p_{det}$ 220, in the received depth images 108. As described in detail below with relate to FIG. 4, the feature detection module 202 first detects a head, neck, and torso (H-N-T) template, and then detects the features based on the detected H-N-T template.

The interpolation module 204 is configured to generate interpolated features $\bar{p}_{det}$ 222 in response to $p_{det}$ received from the feature detection module 202. In one embodiment, the depth images transmitted to the pose estimation system 100 is captured at approximately 15 frames per second using a time of flight depth imaging device (e.g., a Swiss Ranger SR-3000 3D time of flight camera). For numerical stability in subsequent modules, the interpolation module 204 re-samples the detected features to a higher rate (e.g., 100 HZ) and represented by the vector $\bar{p}_{det}$.

The missing feature augmentation module 206 is configured to augment $\bar{p}_{det}$ with positions of features missing in the depth image stream 108 and generate desired (or augmented) feature vector, denoted by $p_d$ 224. The number of detected features at each frame may be fewer than eight (i.e. m<k=8) due to occlusions or unreliable observations. The missing feature augmentation module 206 receives the predicted features p from the pose reconstruction module 208 through a feedback path 240 and utilizes p to augment the missing features. The augmented features $p_d$ represents the k=8 desired features used as input to the pose reconstruction module 208.

The pose reconstruction module 208 is configured to generate estimated poses 230 q and predicted features p 228 based on $p_d$, the accurate human model, and its constraints. The pose reconstruction module 208 is further configured to transmit p to the missing feature augmentation module 206 and the ambiguity resolve module 210 to resolve subsequent ambiguities and to estimate intermittently missing or occluded features. The estimated (or reconstructed, recovered) pose, parameterized by the vector q, describes the motion of the human model (e.g., an n=17 degree of freedom upper body model). The predicted features p are fed-back to the missing feature augmentation module 206 to augment intermittently missing or occluded features, and to the ambiguity resolve module 210 to resolve ambiguities in case multiple candidate features are detected.

The ambiguity resolve module 210 is configured to resolve ambiguities when the feature detection module 202 detects multiple possible candidate features. The ambiguity resolve module 210 receives the predicted features p from the pose reconstruction module 208 through a feedback path 250 and utilizes p to resolve the ambiguities. For example, the ambiguity resolve module 210 may choose the candidate feature that is closest to the corresponding predicted feature to be the detected feature. Alternatively or additionally, the ambiguity resolve module 210 may use the predicted feature as the detected feature. FIG. 7D illustrates two feature candidates for the left hand (one shown in the left frame and the other in the right frame). Based on the predicted feature, the ambiguity resolve module 210 identifies the left hand feature as indicated in the right frame.

The pose estimation system 100, or any of its components described above, may be configured as software (e.g., modules that comprise instructions executable by a processor), hardware (e.g., an application specific integrated circuit), or a combination thereof. The software and/or hardware may operate in a computer system that is structured to include a processor, memory, computer-readable storage medium (e.g., hard drive), network interfaces, and applicable operating system and other functional software (e.g., network drivers, communication protocols). Those of skill in the art will recognize that other embodiments can have different and/or additional modules than those shown in FIG. 2. Likewise, the functionalities can be distributed among the modules in a manner different than described herein. Further, some of the functions can be provided by entities other than the pose estimation system 100.

System Operation

Figure 3:
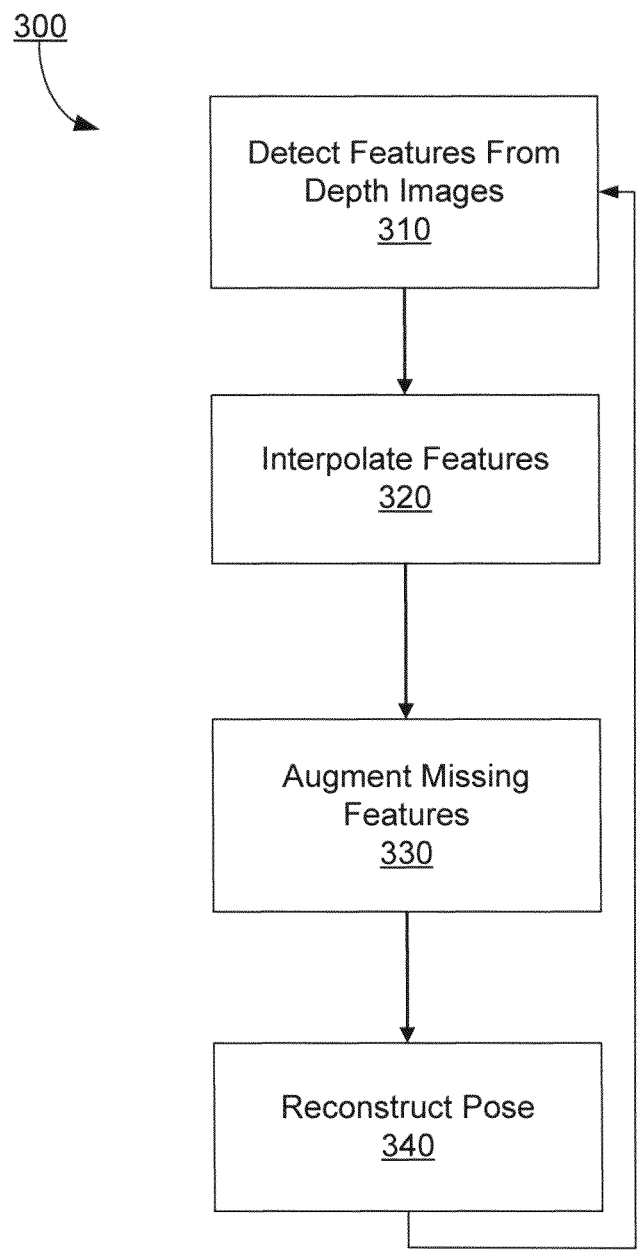
FIG. 3 is a flow diagram illustrating a pose estimation process in accordance with one embodiment of the invention.

FIG. 3 is a flowchart illustrating an example process of the pose estimation system 100 for estimating upper body human pose in accordance with one embodiment of the invention.

The pose estimation system 100 (or the feature detection module 202) detects 310 upper body features of the human actor in the depth image stream 108. In one embodiment, the pose estimation system 100 detects 310 the features by first detecting a head-neck-torso deformable template (also called H-N-T template), and then detecting the features based on the detected H-N-T template. The process to detect 310 the features are described in further detail below with relate to FIG. 4. When multiple candidate features are detected, the pose estimation system 100 utilizes the previously generated predicted features p to resolve ambiguities. For example, the pose estimation system 100 may choose the candidate feature that is closest to the corresponding predicted feature to be the detected feature. Alternatively or additionally, the pose estimation system 100 may use the predicted feature as the detected feature.

The pose estimation system 100 (or the interpolation module 204) interpolates 320 the detected features $p_{det}$ to re-sample the data to a higher rate (e.g., 100 Hz). In one embodiment, the pose estimation system 100 interpolates 320 the detected features using a local cubic spline interpolation routine. The interpolation is performed to ensure stability of numerical integrations performed in the pose reconstruction module 208. In one embodiment, the pose estimation system 100 low-pass filters the detected features $p_{det}$ before interpolating the filtered features.

The pose estimation system 100 (or the missing feature augmentation module 206) augments 330 the interpolated features $\bar{p}_{det}$ with positions of undetected features and generate augmented feature vector $p_d$. As noted above, the pose estimation system 100 may detect less than eight upper body features at each frame due to occlusions or unreliable observations. The pose estimation system 100 estimates those undetected features using previously generated predicted features p. If m<k, the detected features are augmented with (k−m) predicted features p obtained from forward kinematics computations of the reconstructed pose.

The pose estimation system 100 (or the pose reconstruction module 208) reconstructs 340 the observed upper body pose q of the human actor in a human model and predicts subsequent features (or feature point positions) p. The predicted position of each feature is described by the vector $p_i$ and referenced to a base frame corresponding to a waist joint coordinate system. In one embodiment, the pose estimation system 100 reconstructs 340 human pose by tracking the observed features and prioritizing features according to their importance or level of confidence. The pose estimation system 100 predicts subsequent features by enforcing kinematic constraints of the human model, such as joint limitations and self penetration avoidance.

The pose estimation system 100 expresses the observed and predicted features in Cartesian space. These features do not necessarily define the degrees of freedom required to fully describe the motion of the human model. For an n degree of freedom human model, the configuration space, or joint space, described here by vector $q=[q_1, \ldots, q_n]^T$, fully characterizes the motion of the human model. The mapping between configuration space velocities and Cartesian space velocities is obtained by considering the differential kinematics relating the two spaces, $$\dot{p}_i = J_i(q)\dot{q} \qquad (1)$$

where $J_i \in \Re^{3 \times n}$ is the Jacobian of the $i_{th}$ feature and $\dot{p}_i$ is the velocity of $p_i$. See J. J. Craig, "Introduction to robotics, mechanics and control", Addison-Wesley, 2nd edition (1989), the content of which is incorporated by reference herein in its entirety.

One or more portions of the method 300 may be implemented in embodiments of hardware and/or software or combinations thereof. For example, the method 300 may be embodied through instructions for performing the actions described herein and such instrumentations can be stored within a tangible computer readable medium (e.g., flash memory, RAM, nonvolatile magnetic storage device) and are executable by a computer processor. Furthermore, those of skill in the art will recognize that other embodiments can perform the steps of the method 300 in different order. Moreover, other embodiments can include different and/or additional steps than the ones described here. The pose estimation system 100 can perform multiple instances of the steps of method 300 concurrently and/or perform steps in parallel.

Feature Detection

Figure 4:
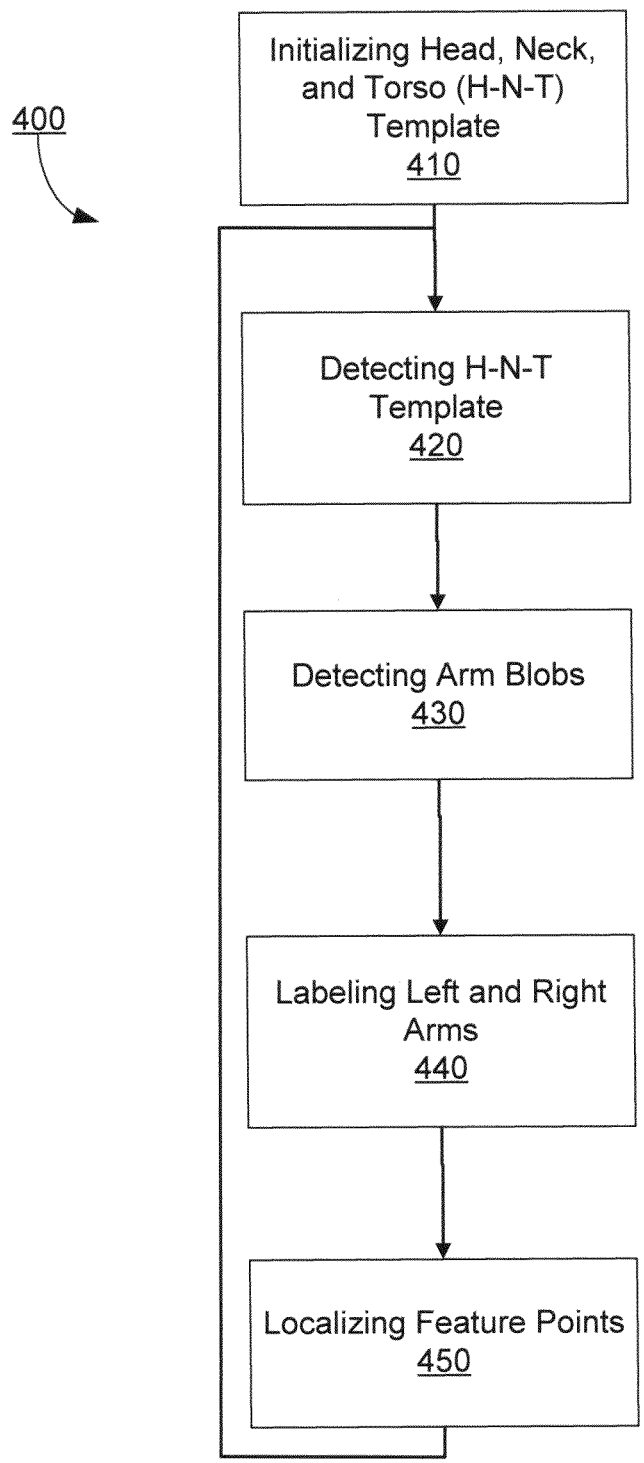
FIG. 4 is a flow diagram illustrating a feature detection process in accordance with one embodiment of the invention.

Referring to FIG. 4, a flow diagram describing a process 400 of the pose estimation system 100 for detecting upper body features in a depth image stream in accordance with one embodiment of the invention. As shown, the pose estimation system 100 initializes 410 a head, neck, and torso (H-N-T) template, and subsequently detects 420 the H-N-T template in the depth image stream. The pose estimation system 100 detects 430 arm blobs in the depth image frames based on the detected H-N-T template, labels 440 the detected left and right arms, and localizes 450 the detected feature points. The steps of the process 400 are described in further detail below with relate to FIGS. 5A-B and 7A-D. Even though the described process 400 detects upper body features in a depth image stream, one skilled in the art will readily recognize from the following description that alternative embodiments of the process may detects body features in other types of image streams, such as a regular two dimensional image stream, without departing from the principles described herein.

Head-Torso Initialization and Tracking

The pose estimation system 100 monitors and tracks the head and torso of the human actor using a head-neck-torso (H-N-T) deformable template. As shown in FIG. 5B, the H-N-T template depicts the head, the neck, and the torso by a circle, a trapezoid, and a rectangle, respectively. In one embodiment, to initialize 410 the tracking, the human actor initially assumes an open arm configuration as illustrated in FIG. 5B. The initialization process involves the registration of an H-N-T template to the depth pixel blob. The torso is represented as a rectangular box with parameters $T=\{x_0, y_0, w_T, h_T, \alpha\}$, where $w_T$ and $h_T$ represent the width and height of the torso box, respectively, $\alpha$ describes the inclination angle of the torso in the image plane relative to the upright posture, and $(x_0, y_0)$ are the frontal (image) plane coordinates at the midpoint of the top edge in the torso box. The torso box is initialized around the foreground gravity center after a few iterations of expanding and shrinking operations. After initializing the torso box, the head circle is predicted based on the learned H-N-T template as described in detail below. The head circle template is parameterized by $H=\{x_{H0}, y_{H0}, r_0\}$, where $r_0$ represents the radius of the head circle template and $(x_{H0}, y_{H0})$ are the head center coordinates.

The neck template is represented as a trapezoid, rigidly attached to the torso box as shown in FIG. 5B. The neck trapezoid is parameterized by $N=\{x_0, y_0, w_{N1}, w_{N2}, h_N, \alpha\}$, where $w_{N1}$ and $w_{N2}$ correspond to the width of the upper and lower trapezoid edges, respectively. The relative edge lengths of the H-N-T template are obtained based on anthropometric studies reported in the biomechanics literature, which report body segment measurements as a fraction of the total body height. See D. A. Winter, "Biomechanics and Motor Control of Human Movement", Wiley-Interscience, New York (1990), the content of which is incorporated by reference herein in its entirety.

Head-Torso Detection

Let $L=\{H, N, T\}$ denotes a configuration of the H-N-T template that localizes the head circle, neck trapezoid, and torso rectangle. Let $\theta$ be a set of distribution parameters used to define the H-N-T template, $$\theta=\{\lambda_1, \ldots, \lambda_5, (\mu_1, \sigma_1), \ldots, (\mu_4, \sigma_4)\}. \quad (2)$$

These parameters are learned by collecting training examples from image processing operations and distribution functions given below. Let $P(I|L, \theta)$ be the likelihood function measured from the image observations, and let $P(L|\theta)$ be the prior probability of the H-N-T configuration. From Bayes' rule, the posterior distribution $P(I|L, \theta)$ can be defined as, $$P(L|I,\theta) \propto P(I|L,\theta)P(L|\theta). \quad (3)$$

Assuming the image likelihood functions for the H-N-T parameters are independent, it follows that $$P(I|L,\theta)=P(I|H)P(I|N)P(I|T). \quad (4)$$

The prior distribution over the H-N-T includes:

$$P(L|\theta)=P(r_0|\theta)P(\overline{\omega}_T|\theta)P(h_T|\theta)P(c|\theta), \quad (5)$$

where c is the distance from the head center to top edge midpoint of the neck trapezoid. The H-N-T template is either detected or rejected based on the following criterion imposed on the likelihood function, $$L(H, N, T) = \begin{cases} \text{yes if } \log(P(L|I,\theta)) > thr \\ \text{no otherwise} \end{cases}, \quad (6)$$

where the threshold (thr) is determined empirically during training by computing the likelihood function L for multiple frames (e.g., hundreds) and observing the H-N-T detection results.

A distribution function $P(I|H)=e^{-\lambda_1 N_{10}-\lambda_2 N_{01}}$ is used for the head likelihood function, where $N_{10}$ and $N_{01}$ represent the number of false negative and false positive pixels, respectively. More precisely, $N_{10}$ is the number of background pixels in the head circle, and $N_{01}$ is the number of foreground pixels in the buffered head boundary (striped region above the head in FIG. 5B). Similarly, a distribution function $P(I|N)=e^{-\lambda_3 N_{10}-\lambda_4 N_{01}}$ is used for the neck likelihood function, where $N_{10}$ is the number of background pixels in the neck trapezoid, and $N_{01}$ is the number of foreground pixels in the buffered neck boundary (striped region on the right and left side of the neck template in FIG. 5B). A distribution function $P(I|T)=e^{-\lambda_5 N_{10}}$ is used for the torso likelihood function, where $N_{10}$ is the number of background pixels in the torso box. Note that the false positive pixels are not considered since the arm frequently occludes the torso box. Finally, the prior distributions are assumed to be a normally distributed Gaussian distribution ($\eta$) with mean $\mu$ and standard deviation $\sigma$, (i.e. ($\eta(\mu, \sigma)$).

$$P(r_0,\theta)=\eta(\mu_1,\sigma_1) \quad (7)$$

$$P(\overline{\omega}_T,\theta)=\eta(\mu_2,\sigma_2) \quad (8)$$

$$P(h_T,\theta)=\eta(\mu_3,\sigma_3) \quad (9)$$

$$P(c,\theta)=\eta(\mu_4,\sigma_4) \quad (10)$$

Figure 7A:
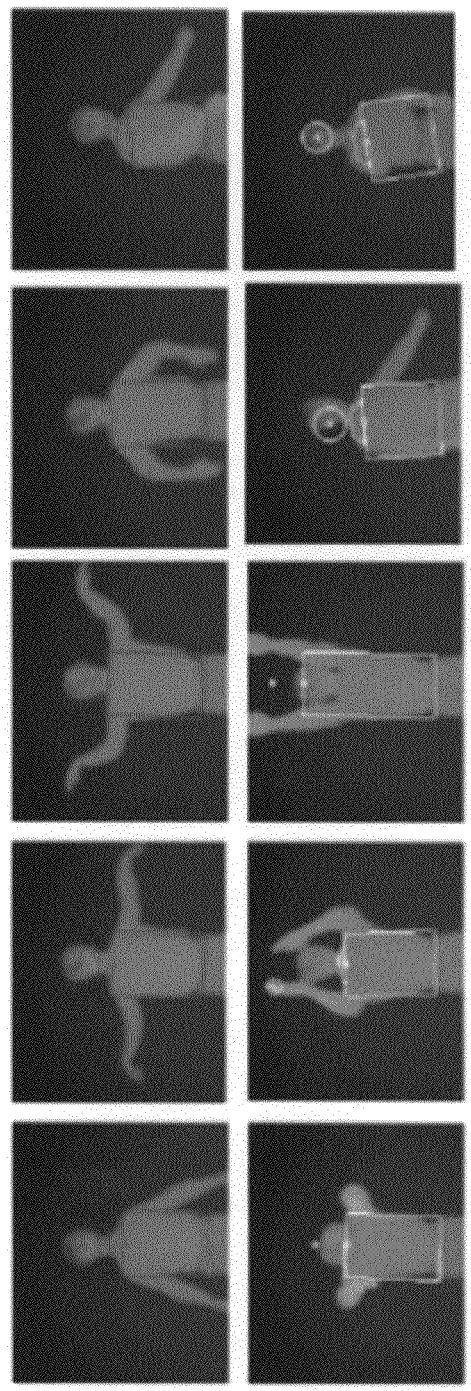
FIGS. 7A-E are diagrams showing results of upper body human pose estimation in accordance with one embodiment of the invention.
Figure 7B:
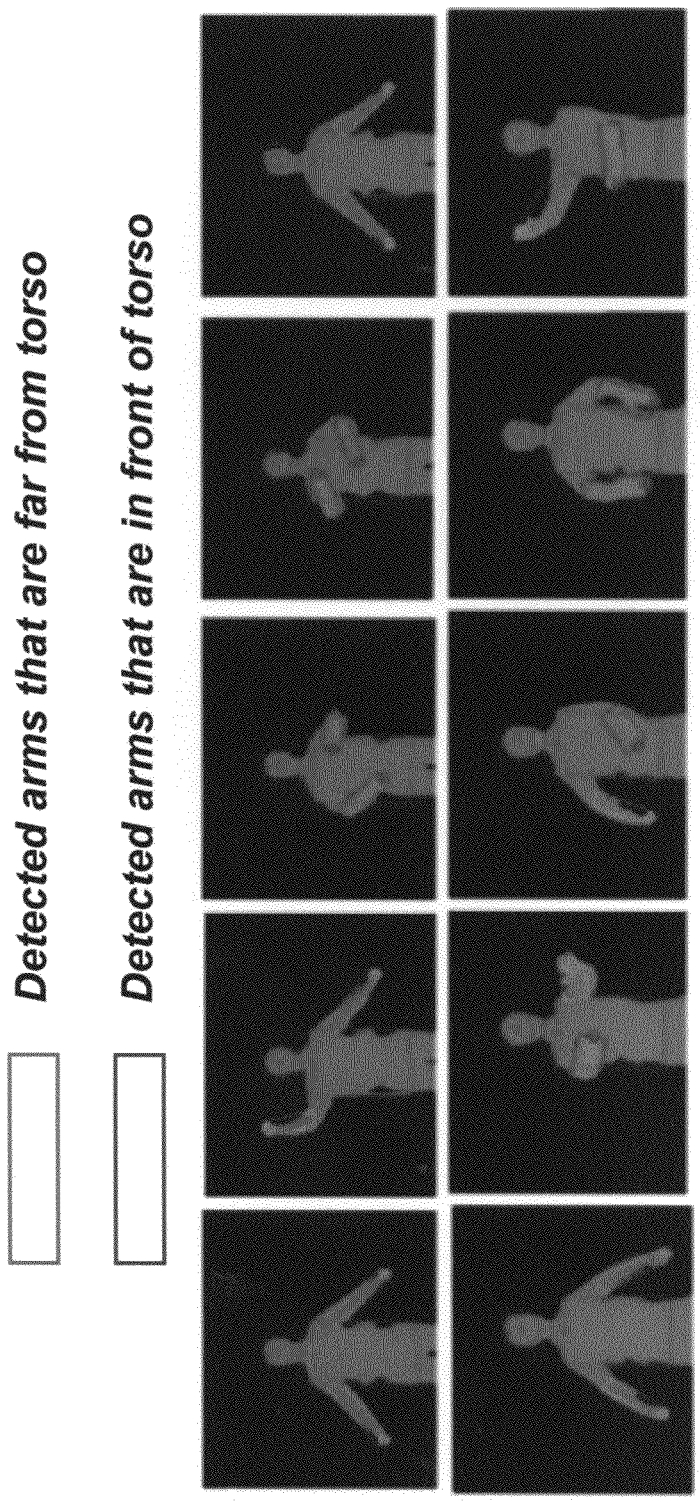

FIG. 7A illustrates detected (top row) and rejected (bottom row) H-N-T template results, showing the effectiveness of the present invention in removing unreliable observations and occasional drifts in the tracking.

Arm Blob Detection

If the H-N-T template is detected, the pose estimation system 100 (or the feature detection module 202) performs an image processing operation referred to here as skeleton analysis to detect an arm blob. The skeleton analysis involves skeletonization, a morphological operation used for thinning the foreground pixel while preserving connectivity. If one or two arm blobs are detected, the pose estimation system 100 further examines the arm blobs in order to determine the hand points corresponding to each detected arm blob. The hand blobs are located at the end-points of the distance transformed skeleton which have a sufficiently large distance values. If a hand point is detected, an arm template is formed by tracing back along the skeleton until the torso template is reached. A few examples from this type of operation are shown as green rectangles in FIG. 7B.

If needed, i.e. one or fewer arm blobs are detected, the pose estimation system 100 performs a second image processing operation referred to here as depth slicing in order to form the arm template. The pose estimation system 100 often performs this operation when the arms occlude the body. In this operation, the pose estimation system 100 extracts the connected blobs by decreasing the cut-off thresholds until the area of blob is too large to be an arm. A few examples from this operation are shown as blue rectangles in FIG. 7B.

Left and Right Arms Labeling

Once the arm templates are formed, the pose estimation system 100 labels them as right arm or left arm accordingly. If an arm is detected by skeleton analysis, it can be labeled as right or left based on the location of the entry point (right or left) at the torso template. If the arm template is detected by depth-slicing, the arm label is assigned based on temporal continuity, i.e. the smaller distance to the left or right arm rectangles obtained from the previous frame.

Upper Body Joint Localization

With the detected body parts including the head, torso, left and right arms, the pose estimation system 100 localizes the 3D features shown in FIG. 5A for further processing. The head center feature is simply the 3D center of the head circle template. Note that the depth values from the depth images are used to determine the z coordinates associated with the 2D image coordinates. The right and left shoulder features correspond to the upper right and left corner points of the torso template, respectively. The waist joint feature is obtained by projecting a vector from the mid-point of the top edge of the torso template towards the midpoint of the bottom edge of the torso template. The length of this vector is obtained from the relative anthropometric parameters obtained from the literature. See D. A. Winter, "Biomechanics and Motor Control of Human Movement", Wiley-Interscience, New York (1990), the content of which is incorporated by reference herein in its entirety. If the H-N-T template is undetected, or if the features are occluded, the pose estimation system 100 uses temporal prediction to estimate the missing features.

A process for the pose estimation system 100 to localize the arm features, including left and right elbows and wrists is described below. If the arm is detected by skeleton analysis, the wrist joint is located near the endpoint of the skeleton. The elbow joint feature is located at the intersection of the upper arm and forearm in the skeleton.

If the arm is detected based on the depth slicing operation, it is assumed that the feature points are located approximately at either ends of the arm rectangle. They are extracted based on the following two effective assumptions:

1. If an arm is in front of the body, the left arm should point to right, and the right arm should point to left.
2. If an arm is beside the body, the elbow and wrist are to be labeled based on the closeness to the predicted model elbow and wrist positions.

Figure 7C:
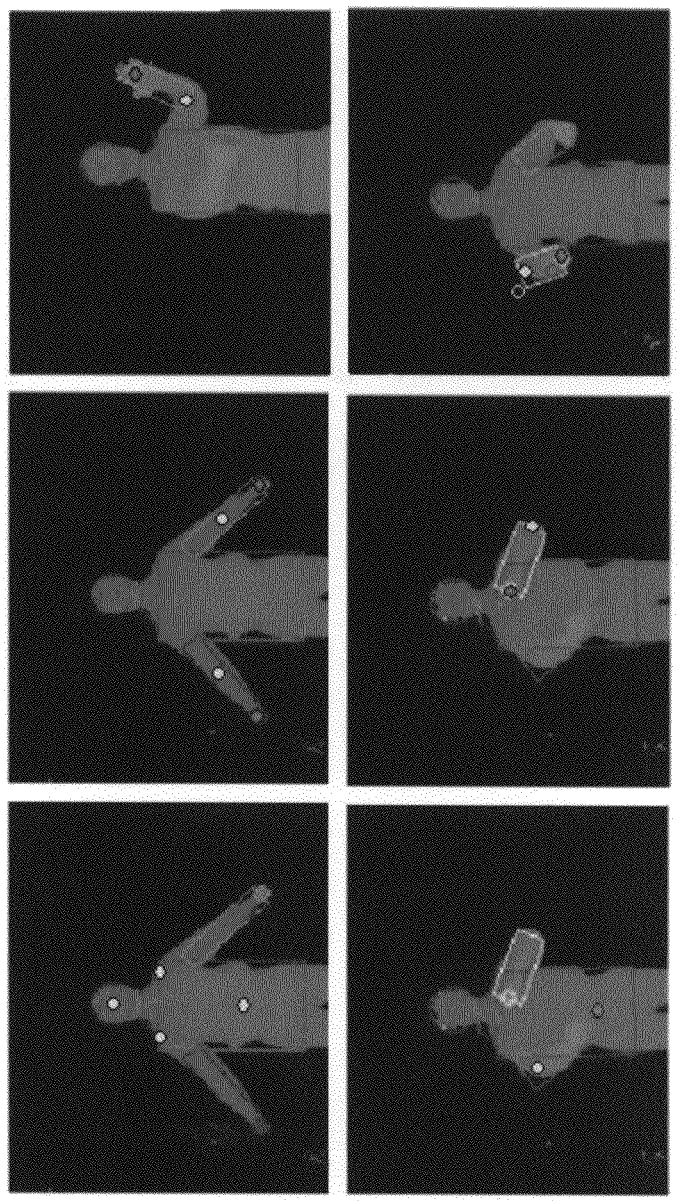
Figure 7D:
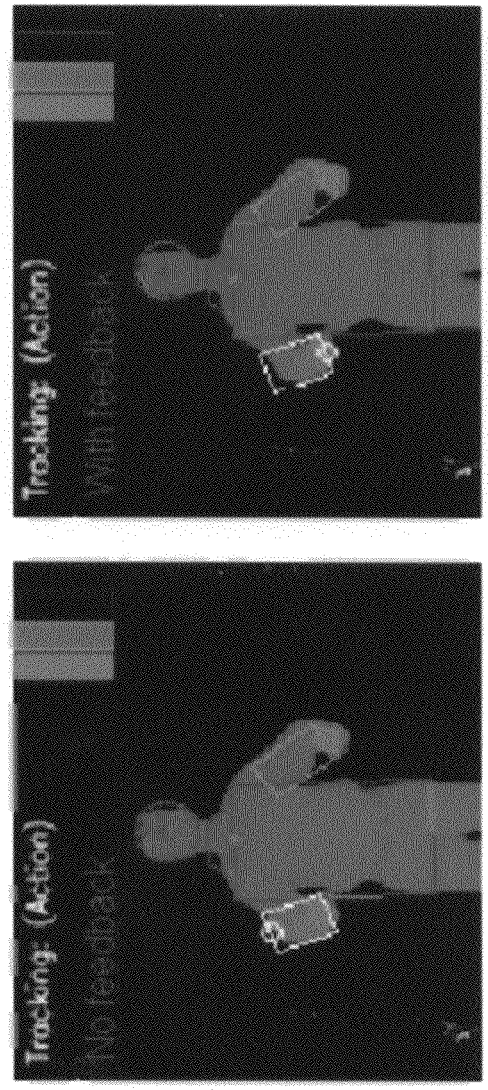

FIG. 7C illustrates the application of first assumption for right arm at the bottom left image, and the application of first assumption for left arm at the bottom middle image, where wrist points are shown as solid red circles and elbow points are showed as solid yellow circles. The application of second assumption is illustrated at the bottom right image, where the predicted model elbow and wrist positions from 3D model posture are displayed as unfilled circles. In the above discussion, the pose estimation system 100 takes advantage of feedback information (predicted features p) from the predicted model pose to improve the feature detection by resolving ambiguities and estimating features which may be intermittently occluded.

Pose Estimation and Feature Prediction

The pose estimation system 100 or (the pose reconstruction module 208) reconstructs 340 the observed upper body pose q of the human actor and predicts subsequent features positions p. In one embodiment, the pose estimation system 100 reconstructs 340 q by prioritizing features according to their importance (or confidence) and tracking the observed poses (Cartesian tracking control). In addition, the pose estimation system 100 predicts subsequent feature positions by enforcing kinematic constraints of the human model, such as joint limitations and self penetration avoidance, which may be categorized as joint limit avoidance (for joint body segments) and self penetration avoidance (for unconnected body segments). These operations are described in detail below.

Cartesian Tracking Control

In one embodiment, the pose estimation system 100 applies a control policy (called Cartesian tracking control) that produces the joint variables (q) such that the Cartesian error between the estimated features and the desired (from observations) features are minimized. The tracking performance is subject to the human model kinematic constraints as well as the execution of multiple and often conflicting feature tracking requirements. In one embodiment, the pose estimation system 100 employs a tracking control approach based on a Cartesian space kinematic control method known as closed loop inverse kinematics (CLIK). The basis for the solution of the CLIK algorithm is the inversion of the differential kinematics relating Cartesian variables and joint variables as described by Equation 1. For simplicity, the superscript i with reference to the $i_{th}$ feature is temporarily omitted in the present section.

Let the desired variables be denoted by a subscript d. The joint velocities may be computed by inverting Equation 1 and adding a feedback error term to correct for numerical drift.

$$\dot{q} = J^*(\dot{p}_d + Ke), \tag{11}$$

where $J^*$ denotes the regularized right pseudo-inverse of J weighted by the positive definite matrix $W_1$, $$J^* = W_1^{-1} J^T (J W_1^{-1} J^T + \lambda^2 I)^{-1} \tag{12}$$

The parameter $\lambda > 0$ is a damping term, and I is an identity matrix. The vector $\dot{p}_d$ corresponds to the desired feature velocity. The matrix K is a diagonal 3×3 positive definite gain matrix, and e is a vector that expresses the position error between the observed and computed features. The position error is simply defined as $e = p_d - p$, where $p_d$ and p correspond to the observed and computed feature positions, respectively.

Managing Multiple Features

In one embodiment, the pose estimation system 100 (or the pose reconstruction module 208) prioritizes features according to their importance or the level of confidence in the observations. For example, since elbow positions are difficult to detect, they may be designated as secondary features while others are designated as primary features.

The formulation above considers estimation of human pose from a single feature. Multiple features can be handled in two ways, namely by augmentation or prioritization. These methods are described in detail in robot motion control literature. See B. Siciliano and J. Slotine, "A general framework for managing multiple tasks in highly redundant robotic systems", *International Conference on Advanced Robotics*, volume 2, pages 1211-1216, Pisa, Italy (1991), the content of which is incorporated by reference herein in its entirety. In one embodiment, the pose estimation system 100 utilizes feature augmentation which refers to the concatenation of the individual spatial velocities and the associated Jacobian matrix and feedback gain matrix.

Let i (i=1 . . . k) be the index of the $i_{th}$ feature $\dot{p}_i$ and the associated Jacobian $J_i$. The pose estimation system 100 forms a 3k×1 augmented spatial velocity vector $\dot{p}$ and a 3k×n augmented Jacobian matrix J as follows, $$\dot{p} = [\dot{p}_1^T \ldots \dot{p}_i^T \ldots \dot{p}_k^T]^T, \tag{13}$$

$$J = [J_1^T \ldots J_i^T \ldots J_k^T]^T. \tag{14}$$

Likewise, $\dot{p}_d$ in the augmented space is the concatenation of the individual feature velocity vectors. The solution of tracking control algorithm in the augmented system follows the same way as that previously described by Equation 11. The tracking error rate for each element of a feature can be controlled by the augmented feedback gain matrix K, which represents a 3k×3k diagonal matrix in the augmented space. The trajectory tracking error convergence rate depends on the eigenvalues of the feedback gain matrix in Equation 11: the larger the eigenvalues, the faster the convergence. In one embodiment, the function is implemented as discrete time approximation of the continuous time system. Therefore, it is reasonable to predict that an upper bound exists on the eigenvalues, depending on the sampling time. A particular feature or its individual components can be more tightly tracked by increasing the eigenvalue of K associated with that direction. By modulating the elements of K, the pose estimation system 100 can effectively encode the relative level of confidence observed. Measurements with higher confidence will be assigned higher feedback gain values.

Joint Limit Avoidance Constraints

In one embodiment, joint limit avoidance is achieved in the pose estimation system 100 by the proper selection of the weighting matrix $W_1$ in Equation 12. One example weighting matrix is defined by the Weighted Least-Norm (WLN) solution. The WLN solution was originally proposed by T. F. Chan and R. V. Dubey, "A weighted least-norm solution based scheme for avoiding joint limits for redundant joint manipulators", *IEEE Transactions on Robotics and Automation*, 11(2), (1995), the content of which is incorporated by reference herein in its entirety. A WLN solution is formulated in the context of Damped Least Squares Jacobian inverse. The WLN solution is utilized to generate an appropriate weighting matrix based on the gradient of a joint limit function to dampen joints nearing their limits. This solution is described below.

A candidate joint limit function that has higher values when the joints near their limits and tends to infinity at the joint limits is denoted by H(q). One such candidate function proposed by Zghal et al. is given by $$H(q) = \frac{1}{4} \sum_{i=1}^{n} \frac{(q_{i,max} - q_{i,min})^2}{(q_{i,max} - q_i)(q_i - q_{i,min})}, \tag{15}$$

where $q_i$ represents the generalized coordinates of the $i_{th}$ degree of freedom, and $q_{i,min}$ and $q_{i,max}$ are the lower and upper joint limits, respectively. See H. Zghal and R. V. Dubey, "Efficient gradient projection optimization for manipulators with multiple degrees of redundancy", *Int. Conf. Robotics and Automation*, volume 2, pages 1006-1011 (1990), the content of which is incorporated by reference herein in its entirety. The upper and lower joint limits represent the more conservative limits between the physical joint limits and the virtual joint limits used for collision avoidance. Note that H(q) is normalized to account for the variations in the range of motion. The gradient of H, denoted as $\nabla H$, represents the joint limit gradient function, an n×1 vector whose entries point in the direction of the fastest rate of increase of H.

$$\nabla H = \frac{\partial H}{\partial q} = \left[ \frac{\partial H}{\partial q_1}, \ldots, \frac{\partial H}{\partial q_n} \right]. \tag{16}$$

The element associated with joint i is given by, $$\frac{\partial H(q)}{\partial q_i} = \frac{(q_{i,max} - q_{i,min})^2 (2q_i - q_{i,max} - q_{i,min})}{4(q_{i,max} - q_i)^2 (q_i - q_{i,min})^2}. \tag{17}$$

The gradient $$\frac{\partial H(q)}{\partial q_i}$$

is equal to zero if the joint is at the middle of its range and goes to infinity at either limit. The joint limit gradient weighting matrix, denoted by $W_{JL}$, is defined by the following n×n diagonal matrix with diagonal elements $w_{JLi}$ (i=1 . . . n):

$$W_{JL} = \begin{bmatrix} w_{JL1} & 0 & 0 & 0 \\ 0 & w_{JL2} & 0 & 0 \\ 0 & 0 & \ddots & 0 \\ 0 & 0 & 0 & w_{JLn} \end{bmatrix}. \tag{18}$$

The weighting matrix $W_1$ in Equation 12 is constructed by $W_{JL}$ (e.g., $W_1 = W_{JL}$). The diagonal elements $w_{JLi}$ are defined by:

$$w_{JLi} = \begin{cases} 1 + \left| \frac{\partial H}{\partial q_i} \right| & \text{if } \Delta |\partial H / \partial q_i| \geq 0 \\ 1 & \text{if } \Delta |\partial H / \partial q_i| < 0. \end{cases} \tag{19}$$

The term $\Delta |\partial H/\partial q_i|$ represents the change in the magnitude of the joint limit gradient function. A positive value indicates the joint is moving toward its limit while a negative value indicates the joint is moving away from its limit. When a joint moves toward its limit, the associated weighting factor described by the first condition in Equation 19, becomes very large causing the motion to slow down. When the joint nearly reaches its limit, the weighting factor is near infinity and the corresponding joint virtually stops. If the joint is moving away from the limit, there is no need to restrict or penalize the motions. In this scenario, the second condition in Equation 19 allows the joint to move freely. Therefore, $W_{JL}$ can be used for joint limit avoidance.

Self Penetration Avoidance

Self penetration avoidance may be categorized as one of two types: 1) penetration between two connected segments, and 2) penetration between two unconnected segment pairs. By connected segment pairs, it is implied that the two segments are connected at a common joint and assumed that the joint is rotational.

If two segments are connected at a common rotational joint, i.e. connected segments, self collision may be handled by limiting the joint range as described in detail above with relate to joint limit avoidance constraints. Joint limits for self penetration avoidance need not correspond to the anatomical joint limits. Rather, they may be more conservative virtual joint limits whose values are obtained by manually verifying the bounds at which collision does not occur. Therefore, for two segments connected by a rotational joint, joint limit avoidance and self penetration avoidance may be performed by using the same techniques presented above.

Figure 6:
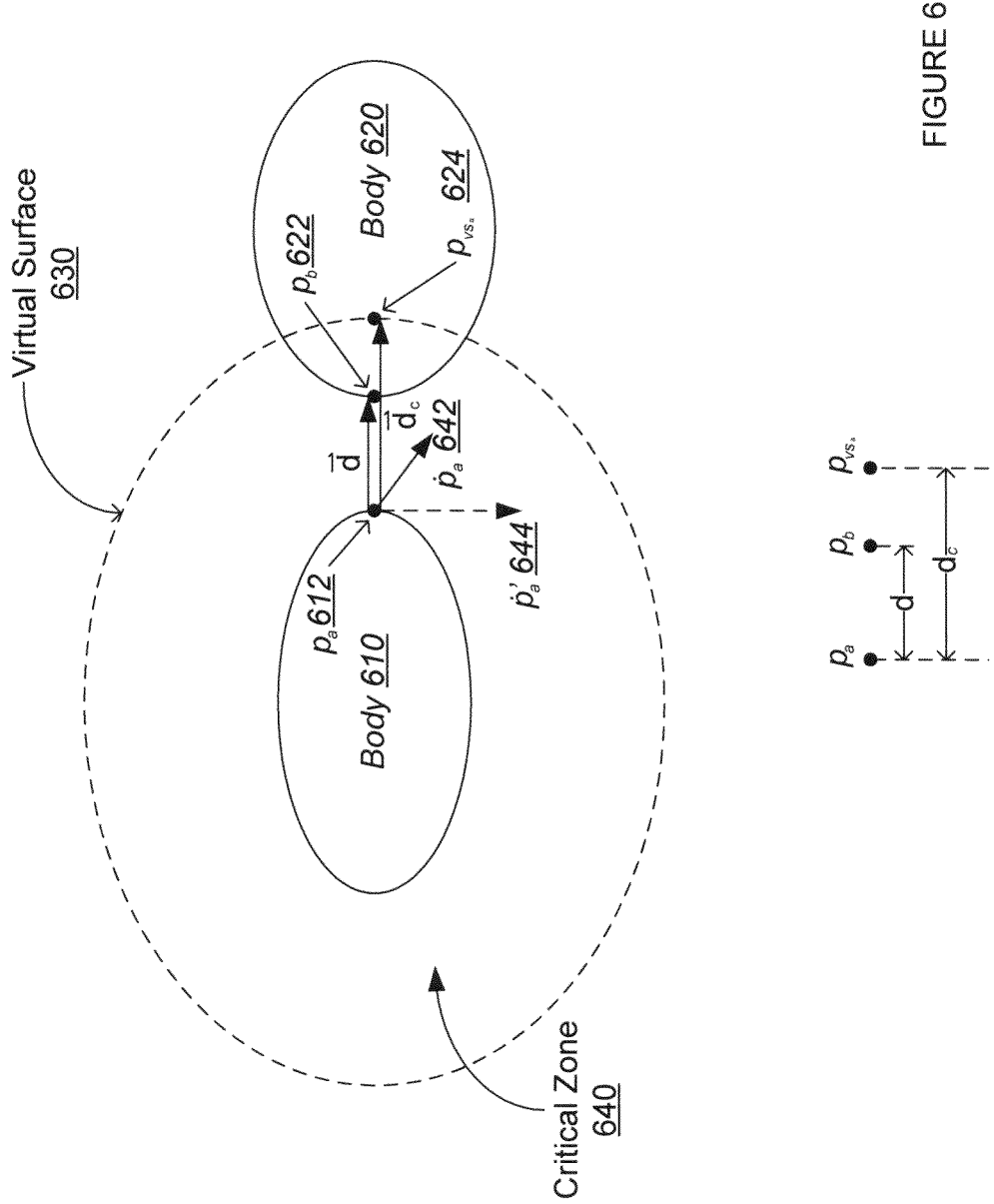
FIG. 6 is a diagram illustrating two unconnected rigid bodies redirected to avoid colliding into each other in accordance with one embodiment of the invention.

Considering the case of self penetration between two unconnected bodies, i.e. bodies which do not share a joint. FIG. 6 is a diagram illustrating two unconnected rigid bodies 610, 620 (i.e., bodies which do not share a joint) redirected to avoid colliding into each other according to one embodiment. In general, body 610 (also referred to as body A) and body 620 (also referred to as body B) may both be in motion. However, for simplicity and without losing generality, suppose body A is moving toward a stationary body B, as indicated by linear velocity $\dot{p}_a$ 642. The coordinates of the shortest distance d (d≥0) between the two bodies are denoted by $p_a$ 612 and $p_b$ 622, referring to the base frame of the joint space. The two points, $p_a$ and $p_b$, are also referred to as collision points.

The unit normal vector between the collision points is denoted by $$\hat{n}_a = \frac{p_b - p_a}{|p_b - p_a|},$$

and the vector pointing from $p_a$ to $p_b$ is denoted by $\vec{d} = d\,\hat{n}_a$. A 3-dimensional virtual surface 630 is constructed to surround body A, shown by a dashed line in FIG. 6. For every point on body A, its associated virtual surface point is located by a vector $\vec{d}_c = d_c\hat{n}$, where $d_c$ is a critical distance, and $\hat{n}$ is the unit normal vector at the surface point. The coordinates of the point on the virtual surface corresponding to $p_a$, denoted by $p_{vs_a}$ 624, is defined by $$p_{vs_a} = p_a + d_c\hat{n}_a. \quad (20)$$

The region between the actual surface of body A and its virtual surface 630 is referred to as the critical zone 640. If body B is stationary, the motion at $p_a$ can be redirected to prevent penetration in the critical zone 640. This redirection is invoked when $d < d_c$.

According to one embodiment, the pose estimation system 100 controls (or redirects) the motion of $p_a$ by modifying the trajectory of the desired task feature $p_d$. A redirected motion of $p_a$ is denoted by $p'_a$ and its associated velocity by $\dot{p}'_a$ 644.

The collision point can be redirected to prevent the two bodies from penetrating deeper into the critical zone 640 using different magnitude and direction of $\dot{p}'_a$ 644. In one embodiment, the collision point $p_a$ is redirected in a direction opposite to the unit normal vector $\hat{n}_a$. In another embodiment, the collision point $p_a$ is redirected so that it slides along a direction which is tangent to the surface of body A at the collision point $p_a$, as shown in FIG. 6.

$$\dot{p}'_a = \dot{p}_a - \langle \dot{p}_a, \hat{n}_a \rangle \hat{n}_a. \quad (21)$$

Utilizing the above redirection vector, the collision point motion of $p_a$ is guided along the virtual surface boundary, producing a more natural motion toward its target.

To find the mapping between $\dot{p}'_a$ and $\dot{p}_d$, consider first the equivalent redirected joint velocity vector $\dot{q}'$, given by $$\dot{q}' = J^*_a \dot{p}'_a + SJ^*_a(\dot{p}_d + Ke), \quad (22)$$

where $J_a = \partial p_a / \partial q$ is the Jacobian at the collision point $p_a$ and $J^*_a$ is its weighted Damped Least Squares inverse. The matrix $S = \text{diag}(s_1 \ldots s_n)$ is a diagonal selection matrix where $s_i = 1$ when the $i_{th}$ column of $J_a$ has all zero entries and $s_i = 0$ elsewhere. The term $J^*_a(\dot{p}_d + Ke)$ is the joint velocity solution obtained from Equation 11.

The physical interpretation of Equation 22 is as follows. The first term determines the joint velocities needed to redirect the collision point velocities along $\dot{p}'_a$. Any zero column of $J_a$ (all zero entries) implies that the associated degree of freedom does not contribute to the motion of the collision point $p_a$. The second term in Equation 22 is the orthogonal complement of the first term which computes the entries for those joint velocities which do not affect the motion of the collision point $p_a$.

Based on the collision free joint velocity commands computed from Equation 22, a redesigned position task descriptor trajectory may be computed as follows $$\dot{p}'_d J \dot{q}'. \quad (23)$$

The closed loop inverse kinematics equation with the modified parameters is given by $$\dot{q} = J^*(\dot{p}'_d + K'e'), \quad (24)$$

where $e' = p'_d - p'$ and $K'$ is an adaptively changing diagonal feedback gain matrix whose values decrease as the distance d decreases. Note that $p'_d$ at the current time t may be computed by a first order numerical integration, $$p'_d(t) = p'_d(t - dt) + \dot{p}'_d(t - dt)dt. \quad (25)$$

The instantaneous redirection $\dot{p}_a \rightarrow \dot{p}'_a$, as described above, produces a discontinuous first derivative of $p_a$ at the boundary $d = d_c$. The discontinuity at $\dot{p}_a$ results in a discontinuity in $\dot{p}_d$, as given by the solution in Equation 23. To preserve first order continuity, the solutions of $\dot{p}'_d$ may be blended before and after redirection occurs. A blended solution to Equation 23 is given by $$\dot{p}'_d = (1-b)\dot{p}_d + bJ_p\dot{q}', \quad (26)$$

where b is a suitable blending function such as the following Sigmoidal function $$b(d) = \frac{e^{-\alpha(d/d_c - \delta)}}{1 + e^{-\alpha(d/d_c - \delta)}}, \quad (27)$$

where $\alpha$ and $\delta$ are scalar parameters used to modulate the blending rate and shift of the blending function, respectively.

Further information of the blending function is found in U.S. application Ser. No. 12/257,664, filed Oct. 24, 2008, titled "Real-Time Self Collision And Obstacle Avoidance", the content of which is incorporated by reference herein in its entirety.

The case where body A is stationary and body B is in motion is the dual of the problem considered above. When both body A and body B are in motion, the redirection vectors can be specified at the critical points $p_a$ and $p_b$ and the task augmentation can be utilized to control both critical points. The augmented velocity vector and Jacobian at the critical points are described by, $$\dot{p}_{ab} = [\dot{p}'_a \dot{p}'_b]^T, \quad (28)$$

$$J_{ab} = [J_a J_b]^T. \quad (29)$$

The redirected joint velocities can be solved following the same procedure as in Equation 22, $$\dot{q}' = J^*_{ab}\dot{p}'_{ab} + SJ^*_{ab}(\dot{p}_d + Ke). \quad (30)$$

The redirected task descriptors and the inverse kinematics solution follows the same procedure as previously described when only the motion of body A is considered. Further information of a process for preventing collisions between unconnected bodies utilizing the above algorithm is found in U.S. application Ser. No. 12/257,664, filed Oct. 24, 2008, titled "Real-Time Self Collision And Obstacle Avoidance", the content of which is incorporated by reference herein in its entirety.

Examples

Figure 7E:
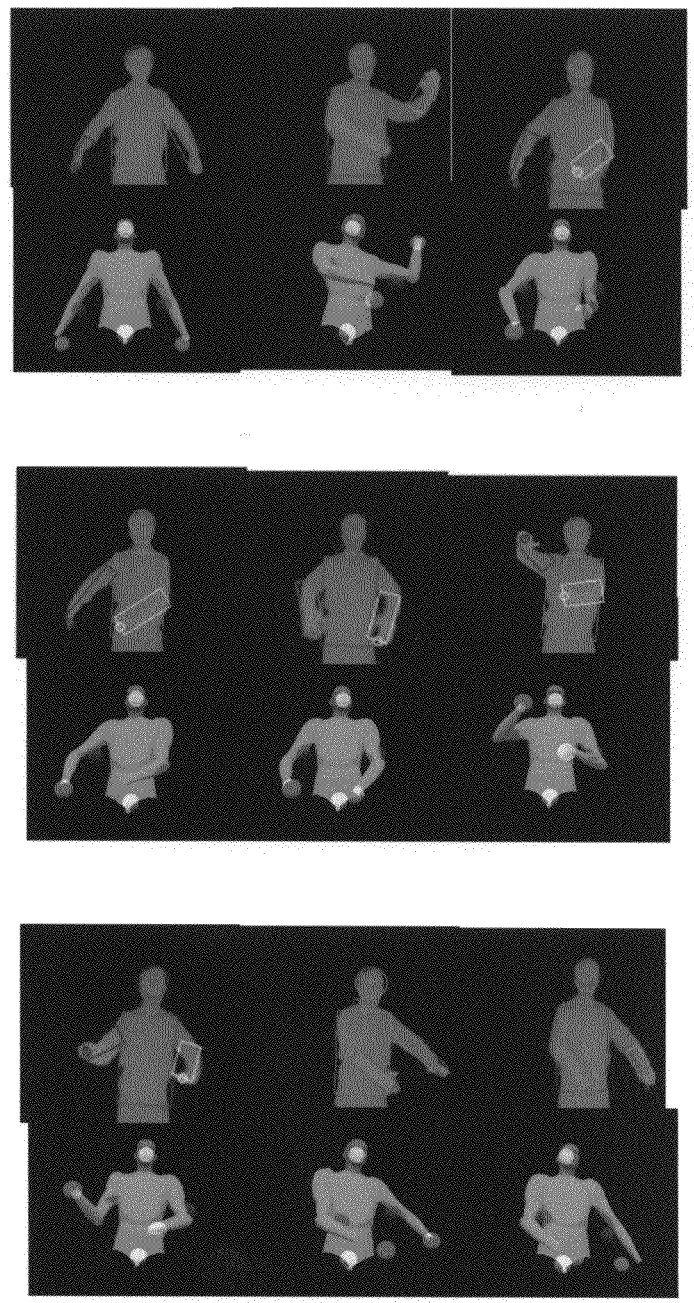

One embodiment of the disclosed human pose estimation system is tested using a single a time-of-flight range image sensor (Swiss Ranger SR-3000 3D time of flight camera). The human performer was asked to perform a Taiji dance motion. FIG. 7E show snapshots of depth images acquired from the range sensor, the desired features (all eight upper body features), as well as the 3D reconstructed pose. The detected elbow positions are assigned a lower tracking priority as compared to the other six features. The detected features are shown by the colored circles overlaid on the depth image while the predicted features are shown by the colored spheres in the 3D reconstructed pose. Note that in some frames, some features may be undetected by the feature detection algorithm. The feature detection algorithm relies on feedback from the pose estimation module to resolve ambiguities in the detection as well as estimate those features which are missing or intermittently occluded.

The test result confirms that the joint limits and self penetration constraints are not violated in these sequences as well as several other sequences obtained using the time-of-flight sensor.

For further detail of the test, please refer to Y Zhu, B. Dariush, and K. Fujimura, "Controlled human pose estimation from depth image streams", *Computer Vision and Pattern Recognition Workshops* (2008), the content of which is incorporated by reference herein in its entirety.

Additional Embodiments

The above embodiments describe a pose estimation system for estimating upper body poses of a human actor in real time. One skilled in the art would understand that the pose estimation system can be used for whole body pose estimation and for pose estimation of other motion generators such as animals. In addition, the pose estimation system can be configured to provide additional functions such as motion retargeting, robotic motion generation and control, and joint torque estimation in biomechanics. For example, the output of the pose estimation system can be effectively used to transfer human motion to a humanoid robot in real time.

Embodiments of the disclosed invention provides a computationally fast, model based control theoretic approach to estimate human pose from a small number of features detected using a probabilistic inferencing algorithm. The disclosed pose estimation system can successfully reconstruct poses of difficult motion sequences which many previous approaches would have difficulty. In addition, the pose estimation system can reliably recover human poses from a small set of features.

Some portions of above description describe the embodiments in terms of algorithmic processes or operations, for example, the processes and operations as described with FIGS. 3 and 4.

One embodiment of the present invention is described above with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The invention can also be in a computer program product which can be executed on a computing system.

The present invention also relates to an apparatus for performing the operations herein. This apparatus may be specially constructed for the purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer based method for estimating a pose of a human subject, the method comprising:
   receiving an image of the human subject;
   detecting a plurality of detected features of the human subject on the image, the detected features comprising representations of anatomical body parts on the human subject;
   determining that at least one undetected feature is missing or occluded based on the detected features;
   augmenting the detected features with at least one predicted feature to replace the at least one undetected feature, the at least one predicted feature generated using a previous pose estimated using a posture model and a previously received image; and
   estimating a pose of the human subject using the posture model, the posture model estimating the pose using the detected features, the at least one predicted feature, and a plurality of kinematic constraints, the posture model using an inverse kinematic computation configured to, for each of the expected features:
   reduce an error between the expected feature and a corresponding one of the detected features, except that for the at least one undetected feature, instead reducing an error between the expected feature and the at least one corresponding predicted feature.

2. The method of claim 1, wherein detecting the plurality of features comprises:
   detecting a head, neck, and torso (H-N-T) template in the image;
   detecting arm blobs in the image based on the H-N-T template;
   labeling left and right arms based on the detected arm blobs; and
   localizing the plurality of feature points on the labeled arms.

3. The method of claim 2, wherein the image comprises a depth image, and detecting arm blobs comprises at least one of the following:
   performing a skeleton analysis to detect the arm blobs; and
   performing a depth slicing to detect the arm blobs.

4. The method of claim 3, wherein the depth image is taken by a single time-of-flight camera.

5. The method of claim 2, wherein the plurality of features comprises: waist, head center, left shoulder, right shoulder, left elbow, right elbow, left wrist and right wrist.

6. The method of claim 1, further comprising:
   generating interpolated features based on the detected plurality of features.

7. The method of claim 1, further comprising:
   responsive to detecting multiple candidates for one of the plurality of features in the image, identify a candidate as the one of the plurality of features based on a previously generated corresponding predicted feature.

8. The method of claim 1, wherein estimating the pose of the human subject in the posture model further comprises:
   tracking the estimated pose of the posture model with an observed pose of the human subject.

9. The method of claim 1, further comprising:
   generating predicted features based on the augmented features and the kinematic constraints of the posture model.

10. The method of claim 1, wherein the kinematic constraints of the posture model comprises joint limitations and self penetration avoidance.

11. The method of claim 10, further comprises:
    constructing a virtual surface surrounding an actual surface of a body segment of the posture model;
    monitoring a distance between the body segment and an unconnected structure;
    detecting that the unconnected structure penetrates the virtual surface;
    determining a redirected joint motion that prevents the unconnected structure from colliding with the body segment; and
    redirecting the body segment based on the redirected joint motion to avoid colliding with the unconnected structure.

12. A computer program product for estimating a pose of a human subject, the computer program product comprising a non-transitory computer-readable storage medium containing executable computer program code for performing a method comprising:
    receiving an image of the human subject;
    detecting a plurality of detected features of the human subject on the image, the detected features comprising representations of anatomical body parts on the human subject;
    determining that at least one undetected feature is missing or occluded based on the detected features;

augmenting the detected features with at least one predicted feature to replace the at least one undetected feature, the at least one predicted feature generated using a previous pose estimated using a posture model and a previously received image; and estimating a pose of the human subject using the posture model, the posture model estimating the pose using the detected features, the at least one predicted feature, and a plurality of kinematic constraints, the posture model using an inverse kinematic computation configured to, for each of the expected features:
reduce an error between the expected feature and a corresponding one of the detected features,
except that for the at least one undetected feature, instead reducing an error between the expected feature and the at least one corresponding predicted feature.

13. The computer program product of claim 12, wherein detecting the plurality of features comprises:
detecting a head, neck, and torso (H-N-T) template in the image;
detecting arm blobs in the image based on the H-N-T template;
labeling left and right arms based on the detected arm blobs; and
localizing the plurality of feature points on the labeled arms.

14. The computer program product of claim 13, wherein the image comprises a depth image, and detecting arm blobs comprises at least one of the following:
performing a skeleton analysis to detect the arm blobs; and
performing a depth slicing to detect the arm blobs.

15. The computer program product of claim 13, wherein the plurality of features comprises: waist, head center, left shoulder, right shoulder, left elbow, right elbow, left wrist and right wrist.

16. The computer program product of claim 12, wherein the method further comprises:
generating interpolated features based on the detected plurality of features.

17. A system for estimating a pose of a human subject, the system comprising:
a computer processor for executing executable computer program code;
a computer-readable storage medium containing the executable computer program code for performing a method comprising:
receiving an image of the human subject;
detecting a plurality of detected features of the human subject on the image, the detected features comprising representations of anatomical body parts on the human subject;
determining that at least one undetected feature is missing or occluded based on the detected features;
augmenting the detected features with at least one predicted feature to replace the at least one undetected feature, the at least one predicted feature generated using a previous pose estimated using a posture model and a previously received image; and
estimating a pose of the human subject using the posture model, the posture model estimating the pose using the detected features, the at least one predicted feature, and a plurality of kinematic constraints, the posture model using an inverse kinematic computation configured to for each of the expected features:
reduce an error between the expected feature and a corresponding one of the detected features,
except that for the at least one undetected feature, instead reducing an error between the expected feature and the at least one corresponding predicted feature.

18. The system of claim 17, wherein detecting the plurality of features comprises:
detecting a head, neck, and torso (H-N-T) template in the image;
detecting arm blobs in the image based on the H-N-T template;
labeling left and right arms based on the detected arm blobs; and
localizing the plurality of feature points on the labeled arms.

19. The system of claim 18, wherein the image comprises a depth image, and detecting arm blobs comprises at least one of the following:
performing a skeleton analysis to detect the arm blobs; and
performing a depth slicing to detect the arm blobs.

20. The system of claim 18, wherein the plurality of features comprises: waist, head center, left shoulder, right shoulder, left elbow, right elbow, left wrist and right wrist.

21. The method of claim 1, wherein the posture model is further configured to prioritize the features based on a level of confidence for each feature.

22. The method of claim 1, wherein the posture model is further configured to use features from the previous image to estimate the pose.

* * * * *